(12) United States Patent
Segawa et al.

(10) Patent No.: US 7,982,840 B2
(45) Date of Patent: Jul. 19, 2011

(54) LIQUID CRYSTAL DISPLAY DEVICE

(75) Inventors: Yasuo Segawa, Kitagata-cho (JP);
Tatsuya Yata, Ogaki (JP); Tomohide Onogi, Anpachi-cho (JP)

(73) Assignee: Sony Corporation, Tokyo (JP)

( * ) Notice: Subject to any disclaimer, the term of this patent is extended or adjusted under 35 U.S.C. 154(b) by 703 days.

(21) Appl. No.: 11/976,392

(22) Filed: Oct. 24, 2007

(65) Prior Publication Data
US 2008/0100787 A1 May 1, 2008

(30) Foreign Application Priority Data

Oct. 31, 2006 (JP) ................................. 2006-296731

(51) Int. Cl.
*G02F 1/1343* (2006.01)

(52) U.S. Cl. ........................................................ 349/141

(58) Field of Classification Search .......................... None
See application file for complete search history.

(56) References Cited

U.S. PATENT DOCUMENTS

| 6,233,034 | B1 | 5/2001 | Lee et al. | |
|---|---|---|---|---|
| 6,522,380 | B2 | 2/2003 | Lee et al. | |
| 6,646,707 | B2 | 11/2003 | Noh et al. | |
| 6,721,027 | B2 * | 4/2004 | Chuang | 349/141 |
| 6,816,222 | B2 | 11/2004 | Ono et al. | |
| 7,136,130 | B2 | 11/2006 | Ono et al. | |
| 7,295,268 | B2 | 11/2007 | Ono et al. | |
| 2009/0015774 | A1 * | 1/2009 | Asakura et al. | 349/141 |

FOREIGN PATENT DOCUMENTS

| JP | A 11-202356 | 7/1999 |
|---|---|---|
| JP | A-2002-182230 | 6/2002 |
| JP | A-2002-296611 | 10/2002 |
| JP | A-2003-131248 | 5/2003 |
| KR | 1999-0062389 A | 7/1999 |
| KR | 2002-0063498 A | 8/2002 |
| KR | 2004-0016570 A | 2/2004 |
| KR | 2004-0061426 A | 7/2004 |

OTHER PUBLICATIONS

Park et al., "Analysis of Improved Transmittance in Fringe-Field Switching Mode Using Positive Liquid Crystal Incorporated with Chiral Dopant," Japanese Journal of Applied Physics, vol. 44, 1A, 2005, p. 324.

* cited by examiner

*Primary Examiner* — Richard H Kim
(74) *Attorney, Agent, or Firm* — K&L Gates LLP

(57) ABSTRACT

A liquid crystal display device includes a substrate, an insulating layer, an upper electrode layer, and a lower electrode layer. The upper electrode layer and the lower electrode layer are formed on the same the substrate via the insulating layer. A plurality of openings are formed in the upper electrode layer and arranged parallel to each other so that an electric field is passed therethrough. Liquid crystal molecules are driven by applying voltage between the upper electrode layer and the lower electrode layer. A minor axis of each of the openings has a width in a range in which a V-T curve, which represents a relationship between voltage and transmittance ratio, does not shift with variation in the width of the minor axis.

20 Claims, 7 Drawing Sheets

LIQUID CRYSTAL DISPLAY DEVICE

CROSS-REFERENCE TO RELATED APPLICATION

This application claims priority from Japanese Patent Application No. 2006-296731 filed in the Japanese Patent Office on Oct. 31, 2006, the disclosure of which is incorporated herein by reference in its entirety.

BACKGROUND

1. Technical Field

The present invention relates to a liquid crystal display device and, more particularly, to a liquid crystal display device that drives liquid crystal molecules by applying voltage between an upper electrode layer and a lower electrode layer that are formed on the same substrate via an insulating layer, wherein one of the upper electrode layer and the lower electrode layer is a common electrode layer and the other is a pixel electrode layer, and a plurality of openings are formed in the upper electrode layer and arranged parallel to each other so that an electric field is passed therethrough.

2. Related Art

In regard to a display type of an existing liquid crystal display device, a TN (twisted nematic) type display device has been widely used. However, the TN type display device has a limited viewing angle due to its display principle. A horizontal electric field type display device has been known as a solution for the above problem, in which a pixel electrode and a common electrode are formed on the same substrate, voltage is applied between the pixel electrode and the common electrode to thereby generate an electric field that is substantially parallel to the substrate, and liquid crystal molecules are thus driven mainly within a plane parallel to the surface of the substrate.

In the horizontal electric field type display device, an IPS (in plane switching) mode display device and an FFS (fringe field switching) mode display device are known. In the IPS mode display device, a comb-shaped pixel electrode and a comb-shaped common electrode are arranged in combination. In the FFS mode display device, an upper electrode layer and a lower electrode layer are formed via an insulating layer, in which one of the upper electrode layer and the lower electrode layer is used as a common electrode layer and the other is used as a pixel electrode layer, and then openings, such as slits, are formed in the upper electrode layer so that an electric field is passed therethrough.

It is conceivable that the relationship between the transmittance ratio of the horizontal electric field type liquid crystal display device and the driving voltage thereof is different from that of the TN mode display device, or the like. There have been some proposals for improvement of the transmittance ratio of the horizontal electric field type display device.

Japanese Unexamined Patent Application Publication No. 11-202356, for example, describes an IPS mode liquid crystal display device that has a high transmittance ratio and a high aperture ratio, in which the strip width of each pixel electrode is formed narrower than the distance between adjacent strips of an opposite electrode, the distance between the strip of the pixel electrode and the strip of the corresponding opposite electrode is smaller than a cell gap, the widths of the strips of the opposite electrode and the widths of the strips of the pixel electrode are formed so that liquid crystal molecules present on these electrodes are movable owing to parabolic electric field generated therebetween.

As described above, JP-A-11-202356 describes display quality in the case of the IPS mode display device, but it does not always apply to display quality in the case of the FFS mode display device. That is, the FFS mode display device has a slit-shaped or a comb-shaped electrode structure, which is only used for an electrode disposed on the outermost surface side among the pixel electrode layer and the common electrode layer, and the electrode having the slit-shaped or comb-shaped electrode structure in the outermost surface layer is formed so that electrode portions having the same electric potentials are arranged with openings formed therebetween. This structure differs from that of the IPS mode display device. Thus, the positional relationship between the openings and the electrode portions in the electrode disposed on the outermost surface side, that is, the relationship between the width L of the conductive portion of each electrode portion and display quality and the relationship between the short side width S of each opening and display quality are different from those of the IPS mode display device.

SUMMARY

An advantage of some aspects of the invention is that it provides an FFS mode liquid crystal display device having an electrode structure that is capable of improving display quality.

Aspects of the invention are based upon conditions of improved display quality which are obtained by evaluating a degree of display quality, when the electrode width L and the minor axis S of each opening in the upper electrode layer located on the outermost surface side are changed, through simulation and experiment in the FFS mode liquid crystal display device. The results are implemented by the following manners.

A first aspect of the invention provides a liquid crystal display device that includes a substrate, an insulating layer, an upper electrode layer, and a lower electrode layer. The upper electrode layer and the lower electrode layer are formed on the same substrate via the insulating layer. A plurality of openings are formed in the upper electrode layer and arranged parallel to each other so that an electric field is passed therethrough. Liquid crystal molecules are driven by applying voltage between the upper electrode layer and the lower electrode layer. A minor axis of each of the openings has a width in a range in which a V-T curve, which represents a relationship between voltage and transmittance ratio, does not shift with variation in the width of the minor axis.

Alternatively, a second aspect of the invention provides a liquid crystal display device that includes a substrate, an insulating layer, an upper electrode layer, and a lower electrode layer. The upper electrode layer and the lower electrode layer are formed on the same substrate via the insulating layer. A plurality of openings are formed in the upper electrode layer and arranged parallel to each other so that an electric field is passed therethrough. Liquid crystal molecules are driven by applying voltage between the upper electrode layer and the lower electrode layer. Where an electrode width, that is, a distance between the adjacent openings, is L and the width of a minor axis of each of the openings is S, and when the sum of L and S is equal to or below 10 μm, the electrode width L is equal to or above 2.5 μm and the width S of the minor axis of each of the openings is equal to or above 4.0 μm.

In the liquid crystal display device according to the above aspects of the invention, each of the openings may be a slit opening that opens with a closed shape. In addition, in the liquid crystal display device according to the above aspects of the invention, the plurality of openings may form a comb-shaped opening such that one ends of the openings are connected to each other. Furthermore, in the liquid crystal display device according to the above aspects of the invention, the upper electrode layer may be a common electrode layer. Moreover, in the liquid crystal display device according to the above aspects of the invention, the upper electrode layer may be a pixel electrode layer.

BRIEF DESCRIPTION OF THE DRAWINGS

The invention will be described with reference to the accompanying drawings, wherein like numbers reference like elements.

DETAILED DESCRIPTION OF EMBODIMENTS

An embodiment of the invention will be described in detail with reference to the accompanying drawings. An FFS mode liquid crystal display device that performs display composed of three colors, that is, red (R), green (G), blue (B), will be described. Of course, for example, the display device may perform display composed of multicolor that further includes C (cyan), or the like, in addition to R, G, B or may simply perform monochrome display. In addition, the shape, structure, material, and the like, described below, are an example for illustration and may be modified in accordance with application of the liquid crystal display device, where appropriate.

Figure 1:
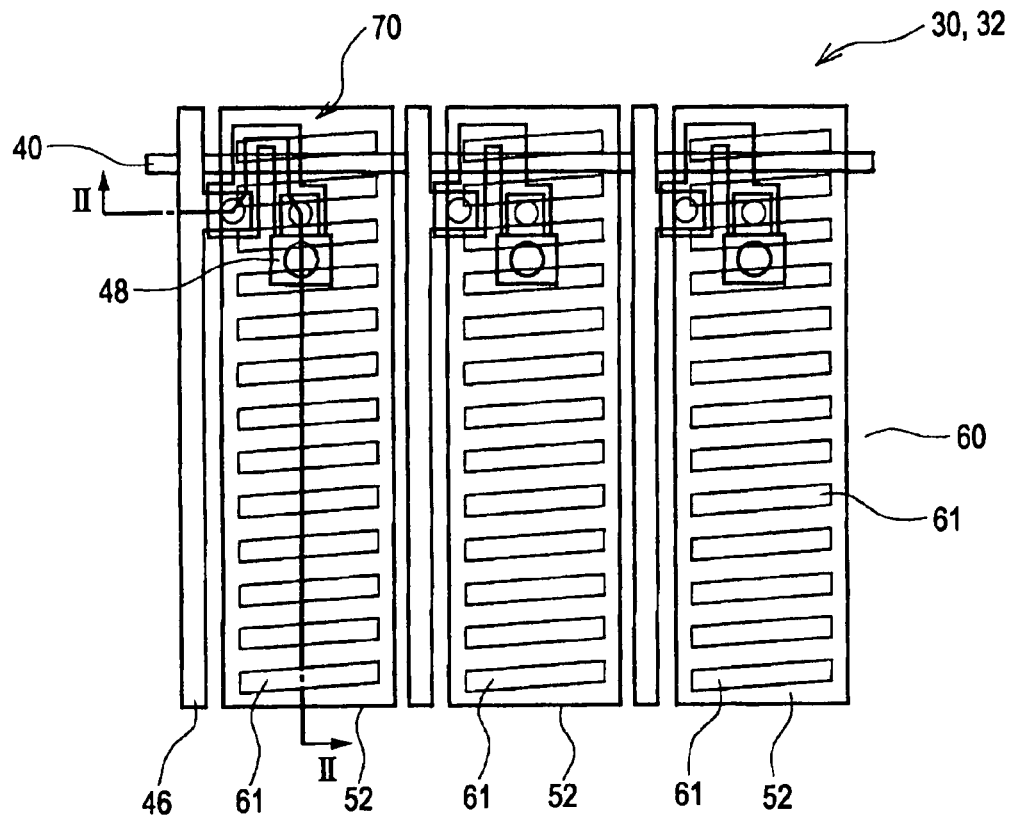
FIG. 1 is a view showing a planar configuration of a display pixel in a display area of an FFS mode liquid crystal display device in which an upper electrode layer is used as a common electrode and slits are formed therein according to an embodiment of the invention.
Figure 2:
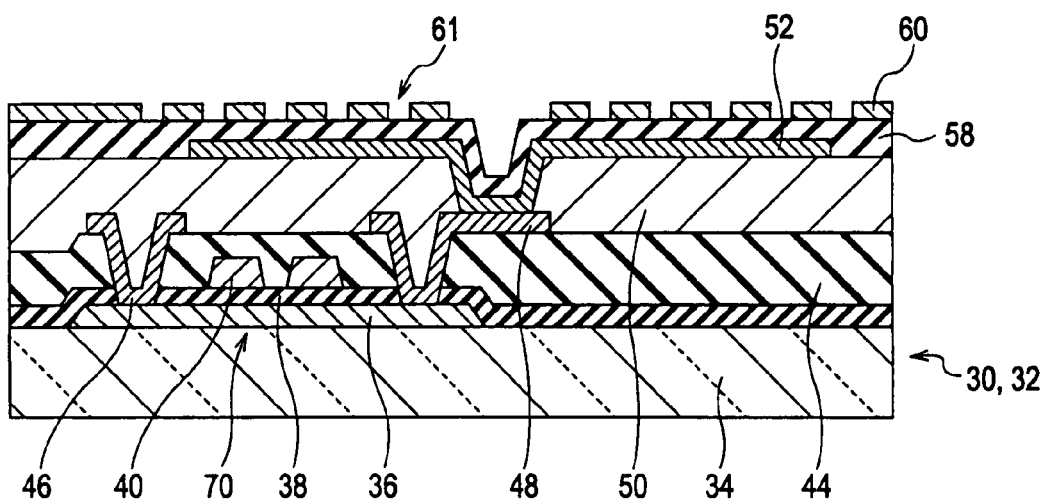
FIG. 2 is a cross-sectional view that is taken along the line II-II in FIG. 1.

FIG. 1 is a view showing a planar configuration of a display pixel, that is, three sub pixels corresponding to three colors, in a display area when display is performed with three color structure composed of R, G, B in an FFS mode liquid crystal display device 30. The FFS mode liquid crystal display device 30 is configured so that a pixel electrode and a common electrode are arranged on an array substrate 32, a color filter, a black matrix, and the like, are arranged on an opposite substrate that is opposed to the array substrate 32, and a liquid crystal molecules layer is sealed between the substrates. FIG. 1 is a plan view of the array substrate 32 as viewed from the opposite substrate and is virtually, because elements arranged on the opposite substrate are omitted, a plan view of the array substrate 32. FIG. 2 is a cross-sectional view taken along the line II-II in FIG. 1 with enlarged in the thickness direction, and only shows the array substrate 32.

As shown in FIG. 1, in the liquid crystal display device 30, a plurality of drain wirings 46 each extend linearly (extend in a vertical direction in an example shown in FIG. 1), and a plurality of gate wirings 40 is arranged to extend in a direction that intersects with the direction in which the drain wirings 46 extend (that is, a perpendicular direction and also a horizontal direction in the example shown in FIG. 1). Separate regions that are defined by the plurality of drain wirings 46 and the plurality of gate wirings 40 are pixel array regions, and three pixel array regions corresponding to three color composed of R, G, B are shown in FIG. 1. Here, pixels are counted in color imaging units, and this unit is defined as one display pixel. Therefore, the pixel array region herein means the region of a sub pixel. Hereinafter, the word "pixel" means a sub pixel unit unless otherwise stated. Note that the common electrode 60 is arranged over the entire surface of the array substrate 32 or over the plurality of pixels and, therefore, FIG. 1 does not show the outline of the common electrode 60 except the shape lines of the slits 61.

Here, in the embodiment, a plurality of drain wirings 46 are arranged with the same pitch. In addition, the width of each drain wiring 46 (the size of each drain wiring 46 along a direction in which the drain wirings 46 are arranged) is the same as well. Furthermore, FIG. 1 shows that the shape of each drain wiring 46 is linear. However, for example, the drain wiring 46 may locally have a curved portion and extend in the above extending direction as a whole. Moreover, the pixel array may be formed in a stripe array, a delta array, a mosaic array, or the like.

A pixel TFT 70 is arranged in each of the pixel arrangement regions which are defined by the drain wirings 46 and the gate wirings 40. In the embodiment shown in FIG. 1, in each of the pixel TFTs 70, a semiconductor layer 36 (see FIG. 2) extends to form substantially a U-shape (in the drawing, the substantially U-shape is inverted upside down), and the gate wirings 40 extend to intersect perpendicularly with the direction in which the drain wirings 46 are arranged across two arm portions of that substantially U-shaped semiconductor layer 36. In this configuration, the source electrode of each pixel TFT 70, together with the drain electrode that is connected to the drain wiring 46, is positioned on the same side relative to the gate wiring 40. In this manner, the pixel TFT 70 has a configuration in which the gate wiring 40 intersects with the semiconductor layer 36 twice between the source and the drain of the semiconductor layer 36, that is, two gate electrodes are provided between the source and drain of the semiconductor layer 36.

Thus, the drain of the pixel TFT 70 is connected to the nearest drain wiring 46, while, on the other hand, the source of the pixel TFT 70 is connected to the pixel electrode 52 through the source electrode 48. The pixel electrode 52 is provided for each pixel and is a plate-like electrode that is connected to the source of the pixel TFT 70 of pixel. FIG. 1 shows the pixel electrode 52 having a rectangular shape.

The common electrode 60, as described above, is arranged on the array substrate 32. However, depending on circumstances, the common electrode 60 may be provided for each pixel. In the case of that configuration, a common electrode wiring is arranged to connect the common electrodes 60 of the pixels. The common electrode 60 is formed so that slits 61, which serve as openings, are provided in a transparent electrode film layer. Each of the slits 61, when voltage is applied between the pixel electrode 52 and the common electrode 60, passes electric field and has the function of generating a horizontal electric field that is mainly parallel to the surface of the substrate.

An alignment layer is arranged on the common electrode 60 and a rubbing process is performed as an alignment process. A rubbing direction may be, for example, a direction parallel to the gate wiring 40 shown in FIG. 1. The slits 61 of the common electrode 60 are formed so that the direction in which the long side of each slit 61 extends is slightly inclined relative to the rubbing direction. For example, the direction in which the long side of each slit 61 may be formed to be slightly inclined at an angle of about 5 degrees relative to the rubbing direction. The alignment layer is formed on the common electrode 60 and the rubbing process is then performed, so that the array substrate 32 is completed.

Next, with reference to the cross-sectional view of FIG. 2, a configuration of the array substrate 32 in the FFS mode liquid crystal display device will be described. FIG. 2 is, as described above, a cross-sectional view that is taken along the line II-II in FIG. 1, showing elements in one of the pixels.

The array substrate 32 includes a transparent substrate 34, the semiconductor layer 36, a gate insulating film 38, the gate wiring 40, an interlayer insulating film 44, the drain wiring 46, the source electrode 48, a planarizing film 50, the pixel electrode 52, an FFS insulating layer 58, and the common electrode 60.

The transparent substrate 34 is, for example, formed of glass. The semiconductor layer 36 is, for example, formed of polysilicon and arranged on the transparent substrate 34. The gate insulating film 38 is, for example, formed of silicon oxide, silicon nitride, or the like, and arranged on the transparent substrate 34 so as to cover the semiconductor layer 36. The gate wiring 40 is, for example, formed of Mo, Al, or the like, and arranged on the gate insulating film 38 so as to be opposed to the semiconductor layer 36. The gate wiring 40 forms the pixel TFT 70 in cooperation with the gate insulating film 38 and the semiconductor layer 36. Note that the gate wiring 40 may also be termed a scanning line.

The interlayer insulating film 44 is, for example, formed of silicon oxide, silicon nitride, or the like, and arranged on the gate insulating film 38 so as to cover the gate wiring 40, or the like. Contact holes are formed to extend through the interlayer insulating film 44 and the gate insulating film 38 and provided at positions corresponding to the source and drain of the pixel TFT 70 in the semiconductor layer 36. The drain wiring 46 is, for example, formed of metal, such as Mo, Al, or Ti. The drain wiring 46 is arranged on the interlayer insulating film 44 and connected through one of the contact holes to the semiconductor layer 36. Note that the drain wiring may also be termed as a signal line. The source electrode 48 is, for example, formed of the same material as that of the drain wiring 46. The source electrode 48 is arranged on the interlayer insulating film 44 and connected through the other contact hole to the semiconductor layer 36.

Here, in the semiconductor layer 36, a portion to which the drain wiring 46 is connected is termed as the drain of the pixel TFT 70 and a portion to which the pixel electrode 52 is connected through the source electrode 48 is termed as the source of the pixel TFT 70; however, the term "drain" and "source" used may be exchanged in contrast to the above.

The planarizing film 50 is, for example, insulating transparent resin, or the like, such as acrylic, and arranged on the interlayer insulating film 44 so as to cover the drain wiring 46 and the source electrode 48. A contact hole is formed above the source electrode 48 to extend through the planarizing film 50.

The pixel electrode 52 is, for example, formed of transparent conductive material, such as ITO (indium thin oxide). The pixel electrode 52 is arranged on the planarizing film 50 and is connected through the above contact hole to the source electrode 48.

The FFS insulating layer 58 is an insulating film layer that is arranged between the pixel electrode 52 and the common electrode 60. The FFS insulating layer 58 is, for example, formed of silicon nitride and arranged on the planarizing film 50 so as to cover the pixel electrode 52.

The common electrode 60 is, for example, formed of transparent conductive material, such as ITO. The common electrode 60 is arranged on the FFS insulating layer 58 and connected to a common electrode wiring (not shown). The common electrode 60 is opposed to the pixel electrode 52 via the FFS insulating layer 58 and has the plurality of slits 61 formed at positions that are opposed to the corresponding pixel electrode 52. Each of the slits 61 is a thin elongated and closed opening having a major axis oriented in a direction that is slightly inclined relative to the direction in which the gate wiring 40 extends. The angle of this inclination is set in conjunction with a rubbing angle in the alignment process.

The alignment layer (not shown) is arranged on the common electrode 60. The alignment layer is a layer that has a function of initially aligning liquid crystal molecules. The alignment layer is, for example, used by performing a rubbing process on an organic film made of polyimide, or the like.

Thus, the common electrode 60, which is an upper electrode layer, and the pixel electrode 52, which is a lower electrode layer, are formed on the same transparent substrate 34 via the FFS insulating layer 58, which is an insulating layer. For example, as shown in FIG. 2, the upper electrode layer, the lower electrode layer and the FFS insulating layer are formed on the same major surface of the substrate. The slits 61 are formed in the common electrode 60 serving as the upper electrode layer. Then, when voltage is applied between the common electrode 60 and the pixel electrode 52 serving as the lower electrode layer, it is possible to generate a horizontal electric field that is mainly parallel to the surface of the substrate and thereby to drive liquid crystal molecules via the alignment layer.

In the above embodiment, via the FFS insulating layer 58, the lower electrode layer serves as the pixel electrode 52 and the upper electrode layer serves as the common electrode 60, and the slits 61 are formed in the common electrode 60. However, it is applicable that the lower electrode layer serves as the common electrode 60 and the upper electrode layer serves as the pixel electrode 52.

Figure 3:
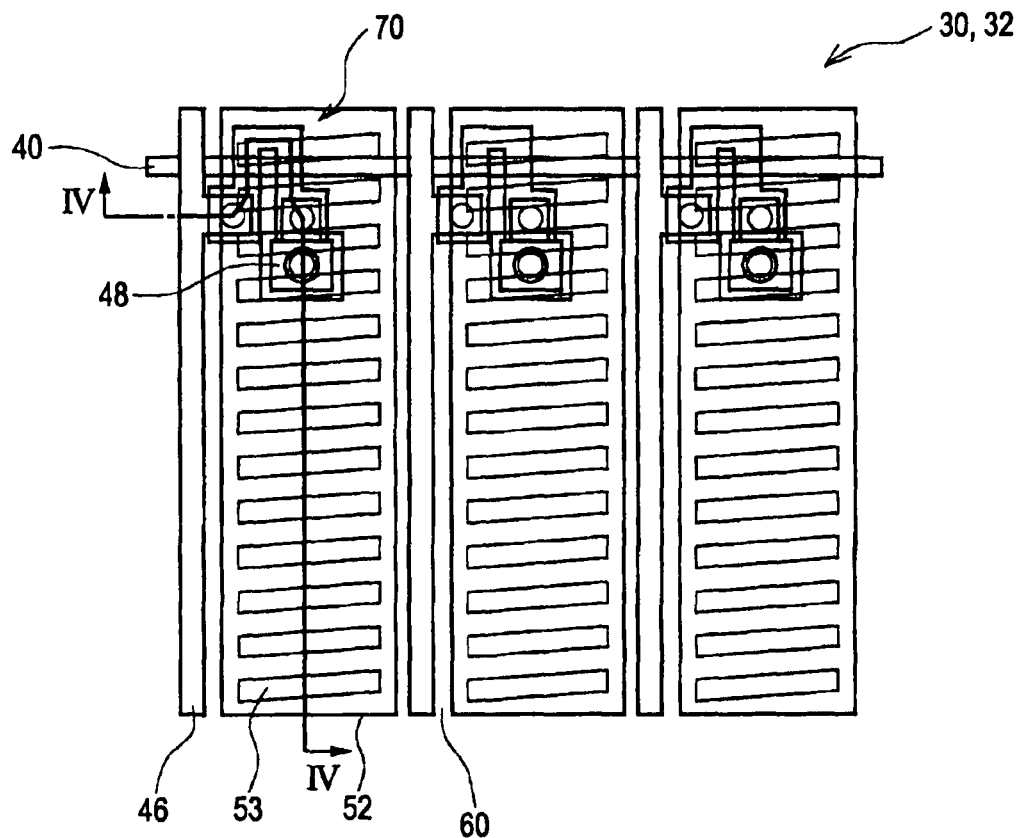
FIG. 3 is a view showing a planar configuration of a display pixel in a display area of an FFS mode liquid crystal display device in which an upper electrode layer is used as a pixel electrode and slits are provided therein according to an embodiment of the invention.
Figure 4:
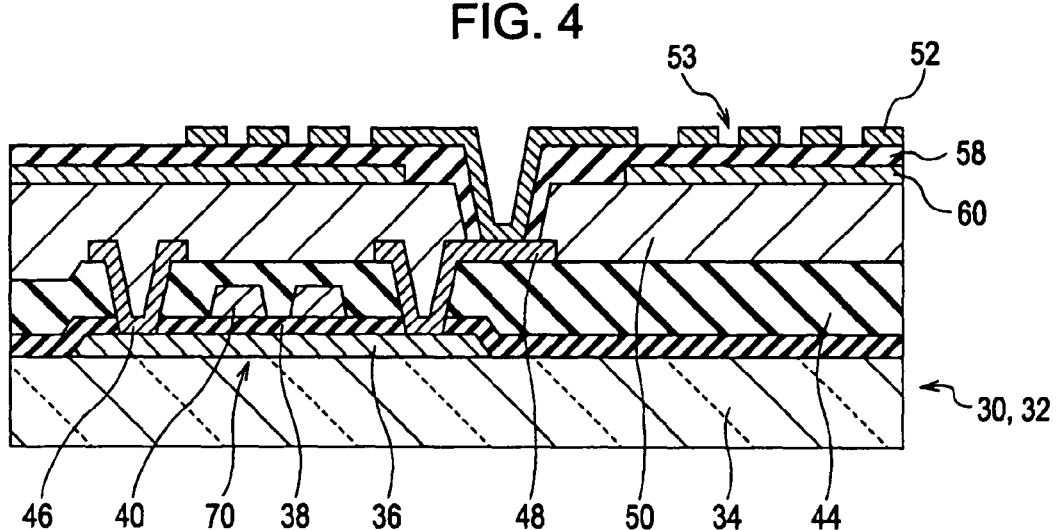
FIG. 4 is a cross-sectional view that is taken along the line IV-IV in FIG. 3.

FIG. 3 and FIG. 4 are views of a configuration of the liquid crystal display device 30 in which the lower electrode layer serves as the common electrode 60, the upper electrode layer serves as the pixel electrode 52, and slits 53 are formed in the pixel electrode 52. FIG. 3 and FIG. 4 correspond to FIG. 1 and FIG. 2, respectively, and specifically show the configuration of the array substrate 32. The same reference numerals used in FIG. 3 and FIG. 4 denote the same or similar components to those shown in FIG. 1 and FIG. 2, and a specific description thereof is omitted.

When the upper electrode layer serves as the pixel electrode 52, as shown in FIG. 4, the pixel electrode 52 that is connected to the source electrode 48 is arranged on the FFS insulating layer 58. Then, the slits 53 are formed in the pixel electrode 52 that is an electrode of the array substrate 32, disposed on the outermost surface side. Each of the slits 53, as described in conjunction with FIG. 1 and FIG. 2, is a thin elongated and closed opening having a major axis oriented in a direction that is slightly inclined relative to the direction in which the gate wiring 40 extends. In addition, the common electrode 60, which serves as the lower electrode layer, is arranged on the entire surface of the array substrate 32 or arranged to extend over the plurality of pixels.

Further, in the above embodiment, the slits, each of which is a thin elongated open groove, are described as the openings formed in the upper electrode layer so that an electric field is passed therethrough. However, it is applicable that the upper electrode structure is formed into a comb-shape or a palisade-shape. In this case, the electric field passes through an opening formed in the comb-shape or the palisade-shape.

Figure 5:
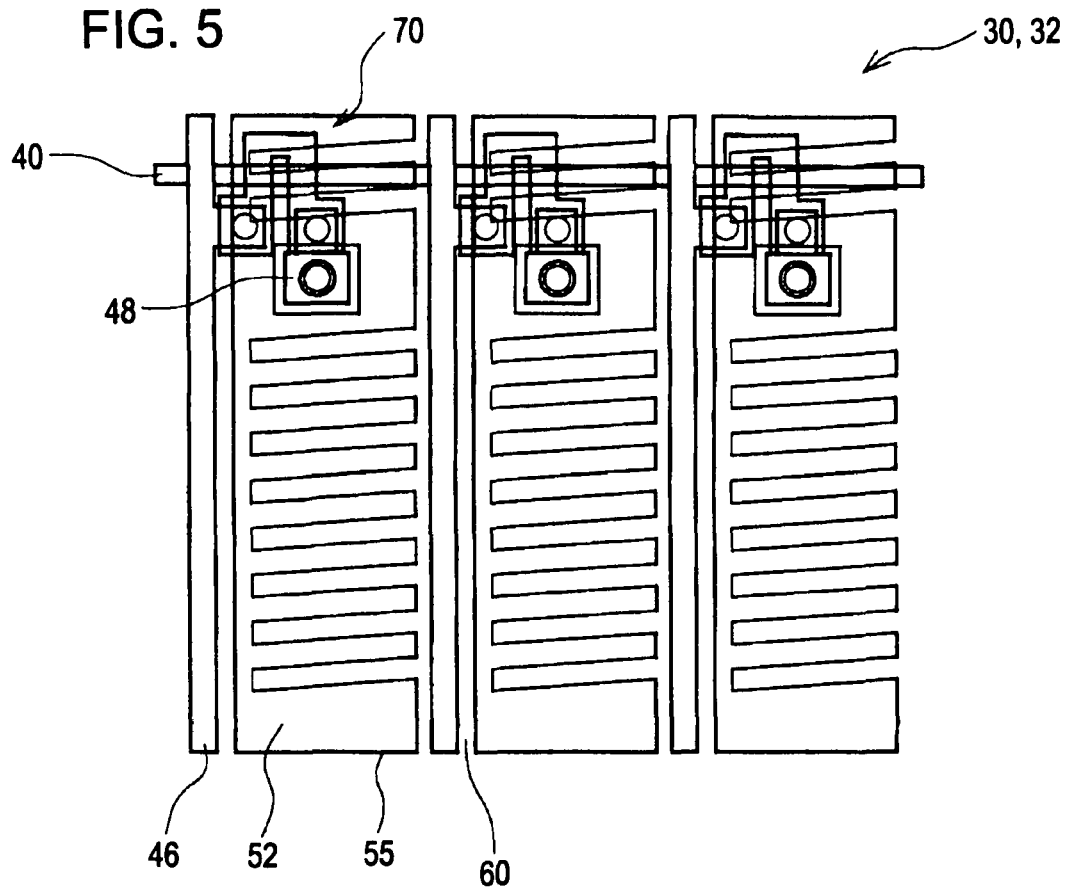
FIG. 5 is a planar configuration of a display pixel in a display area of an FFS mode liquid crystal display device in which an upper electrode layer is used as a comb-shaped pixel electrode according to an embodiment of the invention.

FIG. 5 is a view of a configuration of the liquid crystal display device 30 in which the lower electrode layer serves as the common electrode 60, the upper electrode layer serves as the pixel electrode 52, the pixel electrode 52 is formed into a comb-shape, and an opening 55 is formed between the teeth of the comb-shaped pixel electrode 52 so that an electric field is passed therethrough. FIG. 5 corresponds to FIG. 1 and specifically shows the configuration of the array substrate 32. The same reference numerals used in FIG. 5 denote the same or similar components to those shown in FIG. 1, and a specific description thereof is omitted. In this case, the pixel electrode 52, which serves as the upper electrode layer, is formed into a comb-shape. In addition, the common electrode 60, which serves as the lower electrode layer, is arranged over the entire surface of the array substrate 32 or arranged to extend over the plurality of pixels.

Figure 6:
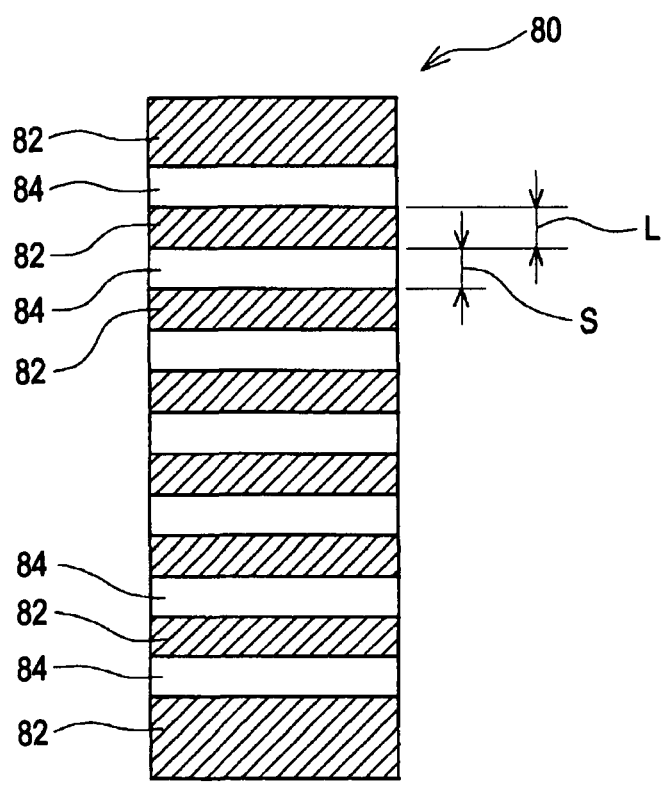
FIG. 6 is a schematic view showing electrode portions and openings in a display pixel according to an embodiment of the invention.

Thus, in the FFS mode display device, the slits or the comb-shaped openings are formed in the upper electrode layer of the array substrate, disposed on the outermost surface side. Therefore, the upper electrode layer is configured so that electrode portions, which are conductive portions, and openings, from which conductive portions are removed, are alternately arranged. FIG. 6 is a schematic view of the electrode portions 82 and the openings 84 in one pixel 80. In the above alternately arranged portion, the width of the minor axis of each opening 84 is defined as S, and the width of each electrode portion 82 serving as the conductive portion, which is an interval between the adjacent openings 84, is defined as L. Hereinafter, S is termed as an electrode interval, and L is termed as an electrode width. Here, the openings 84 correspond to the above described slits 61, 53, or the comb-shaped opening 55.

The following will describe an embodiment of an optimum electrode structure formed in the upper electrode layer of the FFS mode display device with reference to FIG. 7 to FIG. 13. Simulation of the transmittance ratio of a liquid crystal display element in the FFS structure and the V-T curve, which shows a relationship between voltage and transmittance ratio, may be performed using commercially available software, such as LCD MASTER SHINTECH's software, for example. Then, the simulation was performed by changing the electrode interval S and/or the electrode width L where the relationship between a birefringence $\Delta n$ and a thickness d of the liquid crystal molecules layer is defined as $\Delta nd=0.35$.

Figure 7:
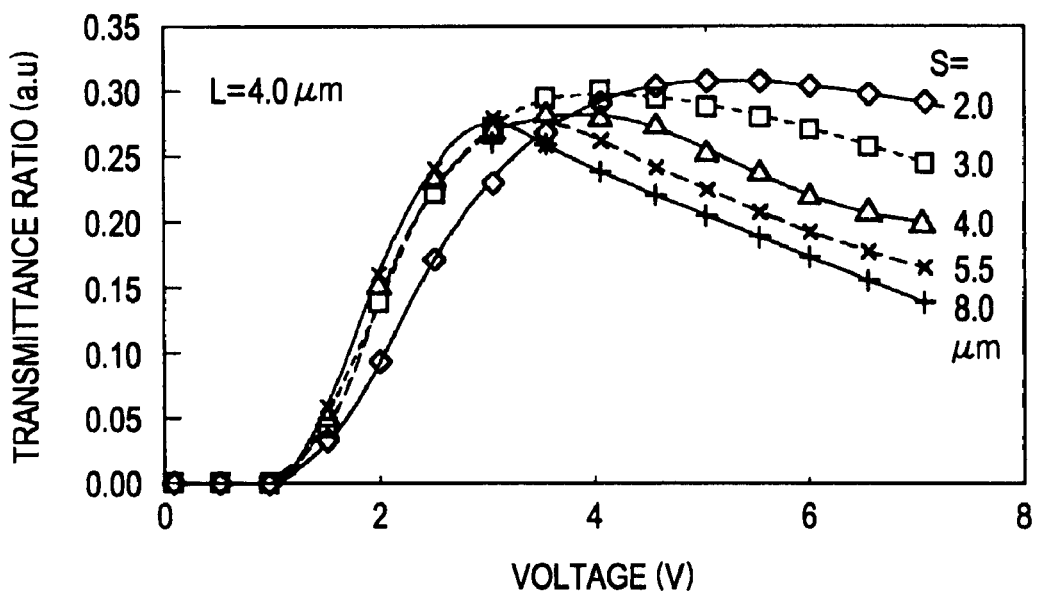
FIG. 7 is a graph showing V-T curves that are calculated by changing an electrode interval S according to the embodiment of the invention.

FIG. 7 is a graph showing V-T curves that are calculated by changing the electrode interval S where the electrode width $L=4.0$ μm. The abscissa axis represents a voltage applied between the pixel electrode and the common electrode, and the ordinate axis represents a transmittance ratio T of light from an arbitrary reference point. FIG. 7 demonstrates that, when the combination of the electrode width L and the electrode interval S is changed, the maximum transmittance ratio varies and the driving voltage, which is a voltage that gives the maximum transmittance ratio, varies. In addition, the voltage at a predetermined transmittance ratio, which is a V-T curve parameter, varies with a change in combination of L and S. For example, V10, which is a voltage at a transmittance ratio of 10%, V50, which is a voltage at a transmittance ratio of 50%, V90, which is a voltage at a transmittance ratio of 90%, change in accordance with the combination of L and S.

Figure 8:
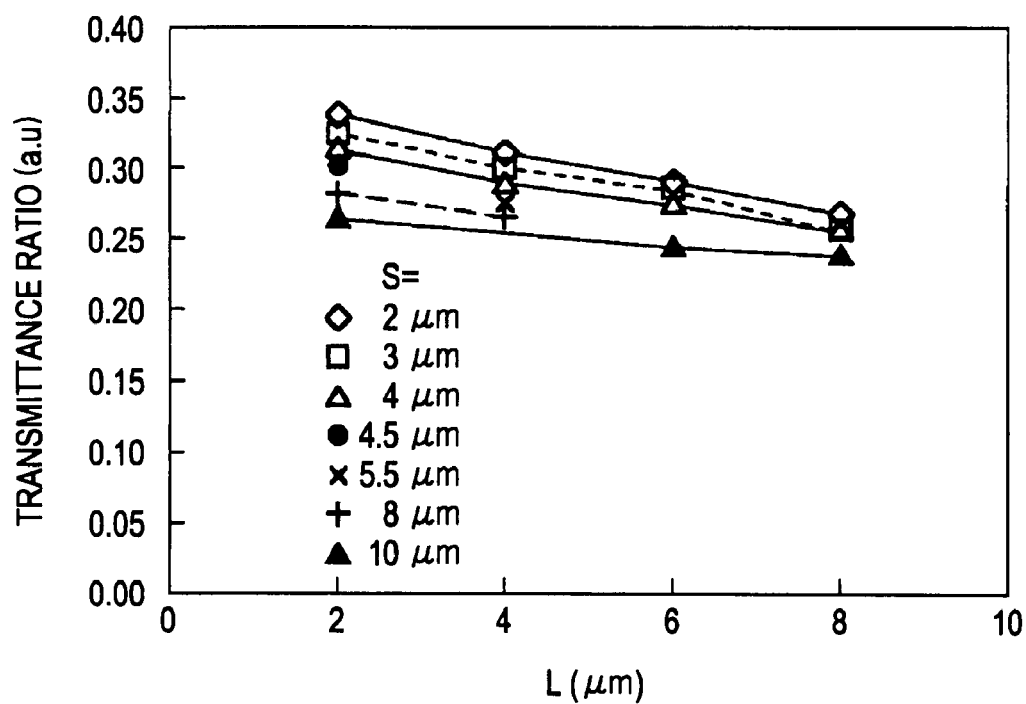
FIG. 8 is a view showing changes in maximum transmittance ratio T, using the electrode interval S as a parameter, when an electrode width L is changed according to the embodiment of the invention.
Figure 9:
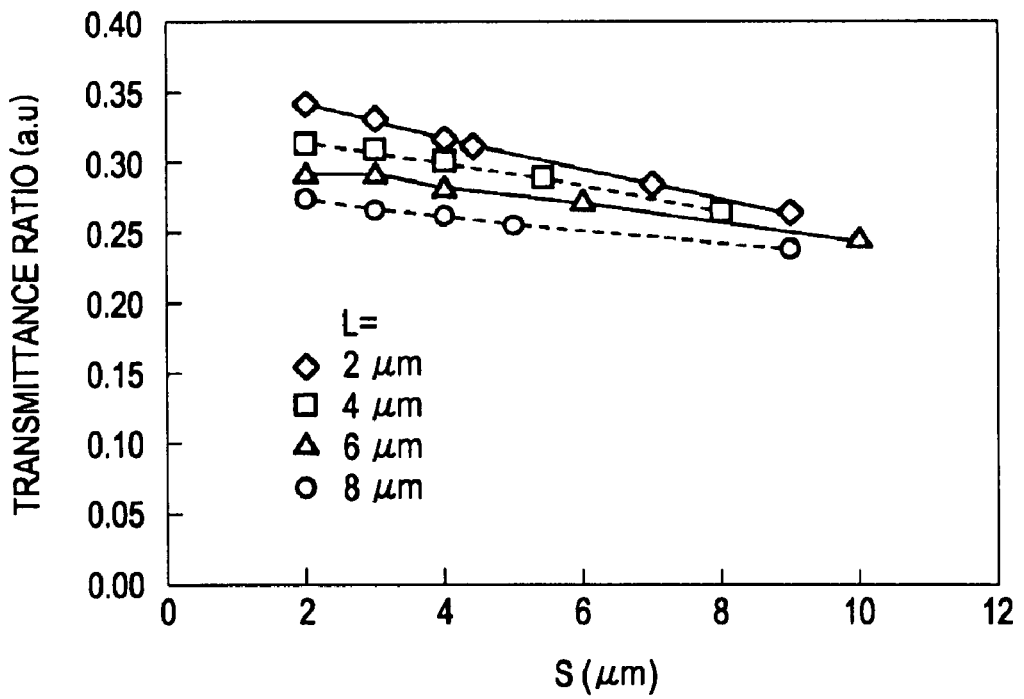
FIG. 9 is a graph showing changes in maximum transmittance ratio T, using the electrode width L as a parameter, when the electrode interval S is changed according to the embodiment of the invention.

FIG. 8 is a view showing changes in maximum transmittance ratio T, using the electrode interval S as a parameter, when the electrode width L is changed. FIG. 9 is a view showing changes in maximum transmittance ratio T, using the electrode width L as a parameter, when the electrode interval S is changed. These drawings demonstrate that the maximum transmittance ratio T is improved the smaller the electrode width L is or the narrower the electrode interval S is.

Figure 10:
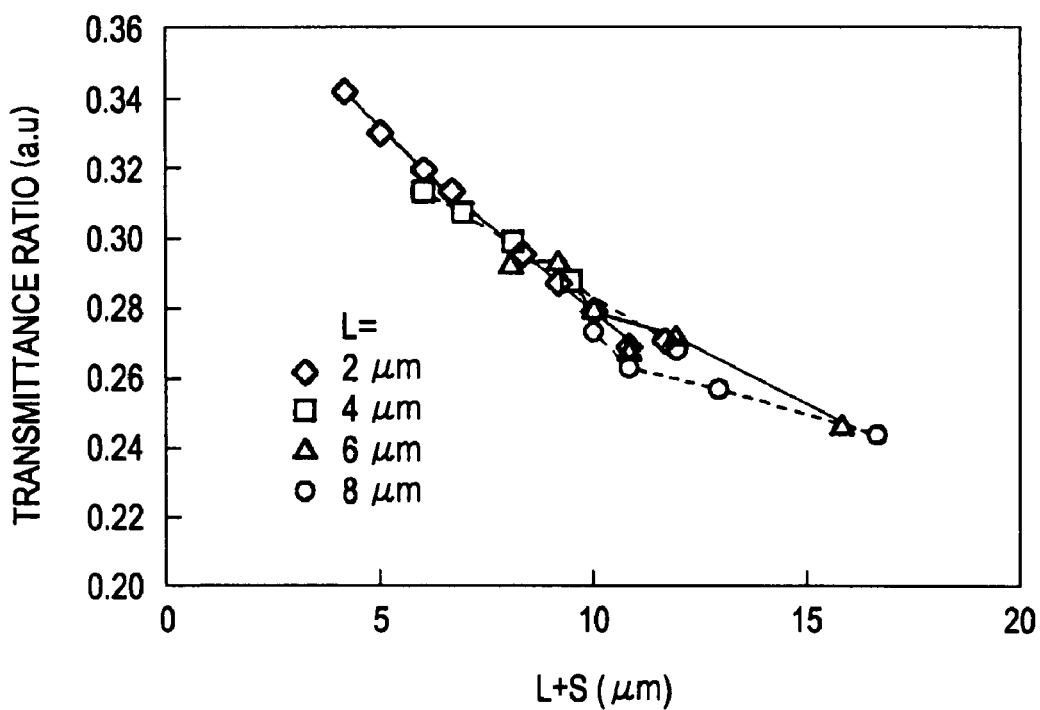
FIG. 10 is a graph showing changes in maximum transmittance ratio T, using the electrode width L as a parameter, when the sum of L and S is changed according to the embodiment of the invention.

FIG. 10 is a graph showing changes in maximum transmittance ratio T, using the electrode width L as a parameter, when the sum of L and S is changed. The results of FIG. 10 demonstrate that it is effective to reduce the sum of L and S in order to improve the maximum transmittance ratio.

Figure 11:
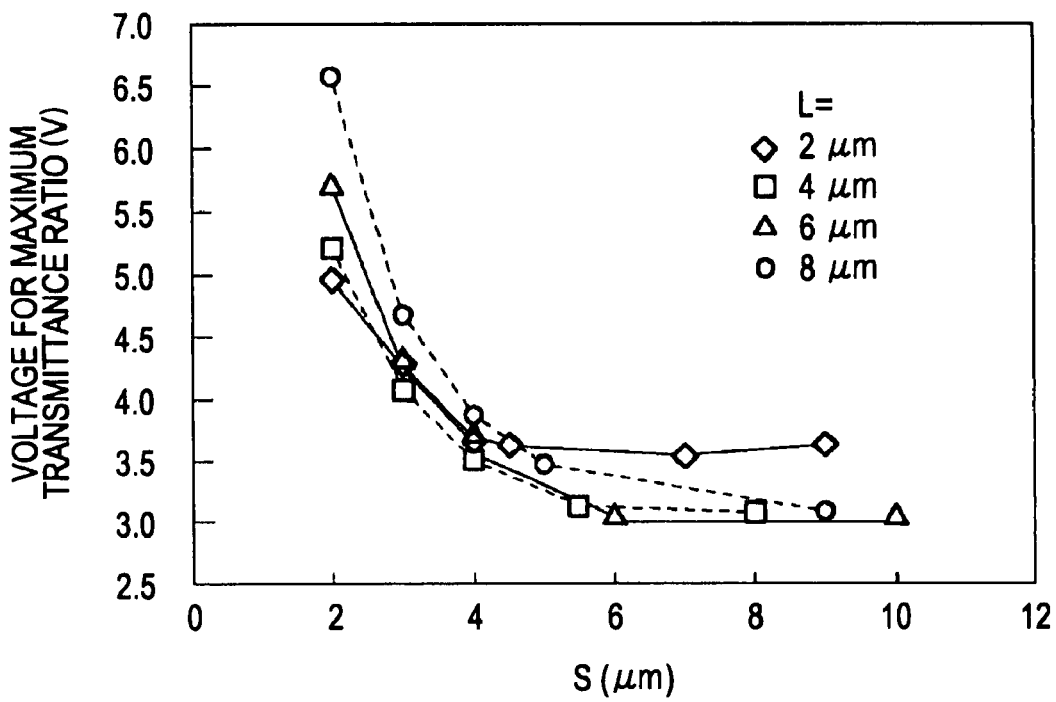
FIG. 11 is a graph showing changes in driving voltage, using the electrode width L as a parameter, when the electrode interval S is changed according to the embodiment of the invention.
Figure 12:
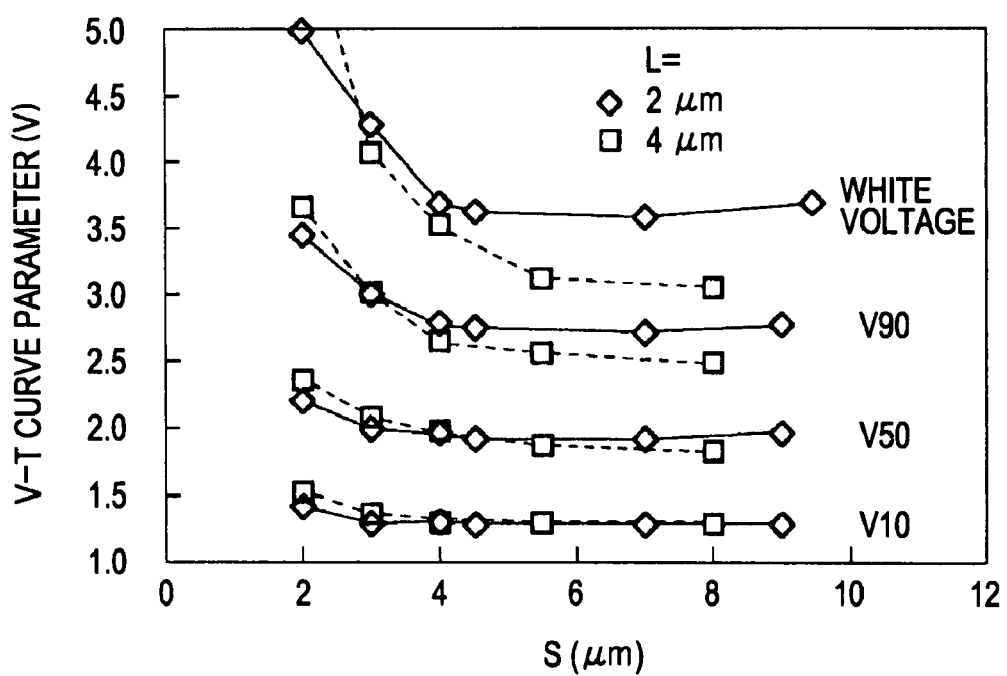
FIG. 12 is a graph showing white voltages that correspond respectively to V10, V50, V90 and V100, which are parameters of the V-T curves, when the electrode interval S is changed according to the embodiment of the invention.

On the other hand, FIG. 11 is a graph showing changes in voltage that exhibits the maximum transmittance ratio, that is, driving voltage, using the electrode width L as a parameter, when the electrode interval S is changed according to the embodiment of the invention. The results of FIG. 11 demonstrate that the driving voltage increases the smaller the electrode interval S is. Similarly, FIG. 12 is a graph showing white voltages that correspond respectively to V10, V50, V90 and V100, which are parameters of the V-T curves, when the electrode interval S is changed where the electrode width L is 2 μm or 4 μm according to the embodiment of the invention. The results of FIG. 12 demonstrate that each of the parameters in the V-T curves is shifted to a high voltage side when the electrode interval S is reduced.

Such a shift in the V-T curves, if the line width L or S fluctuates within the surface of a display panel due to variation in the manufacturing process, results in variation in luminance and chrominance non-uniformity. Hence, the display quality degrades. In addition, the margin of manufacturing process is remarkably reduced and the yield is, thereby, reduced. Thus, in consideration of maintenance of display quality, securing of the margin of manufacturing process, maintenance of the yield, or the like, the shift of the V-T curve needs to be limited. The results of FIG. 12 demonstrate that, when it is considered that the V-T curves do not change particularly in characteristics of V10 to V50, which correspond to intermediate gray-scale levels, the lower limit of the electrode interval S is around 4 μm.

Figure 13:
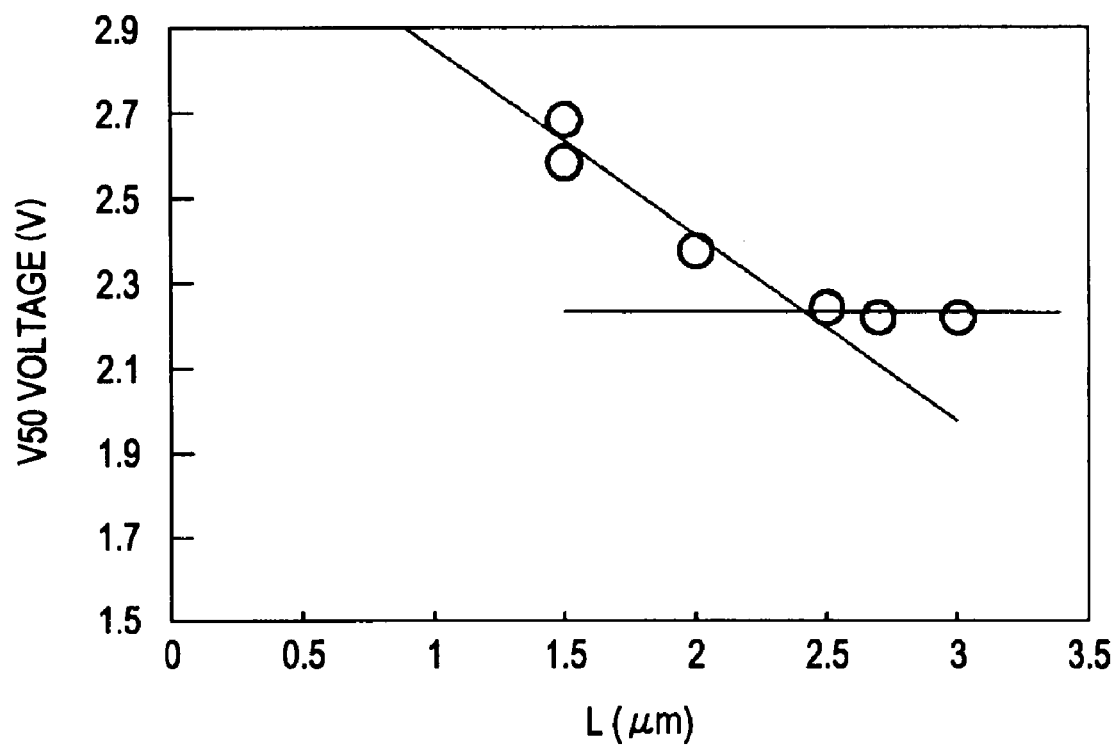
FIG. 13 is a graph showing how V50 depends on the electrode width L, resulting from evaluation of display panels that were made experimentally according to the embodiment of the invention.

On the other hand, the results of simulation shown in FIG. 11 demonstrate that the driving voltage increases the smaller the electrode width L is. In order to confirm the above characteristics, display panels having different electrode widths L were made experimentally with the electrode interval S actually set to 4 μm or above. FIG. 13 is a graph showing how V50 depends on the electrode width L, resulting from evaluation of the display panels that were actually made experimentally. The results of FIG. 12 demonstrate that the increase in driving voltage begins in the region where the electrode interval S is smaller than 4 μm. For this reason, it turns out that the lower limit of the electrode width L is around 2.5 μm.

Because the results of FIG. 10 demonstrate that the maximum transmittance ratio T is reduced the larger the sum of L and S is, when the above results are combined together, the optimum value of L/S is 2.5 μm/4 μm. Alternatively, it may be configured so that, when there is a range of the optimum value, the sum of L and S is equal to or below 10 μm, L is equal to or above 2.5 μm, and S is equal to or above 4.0 μm. Accordingly, in the FFS mode liquid crystal display device, it is possible to set the electrode structure having the upper electrode layer with high display quality.

What is claimed is:

1. A liquid crystal display device, comprising:
  a substrate;
  an insulating layer;
  an upper electrode layer; and
  a lower electrode layer, wherein the upper electrode layer and the lower electrode layer are formed above a same major surface of the substrate with the insulating layer therebetween, wherein a plurality of openings are formed in the upper electrode layer and arranged parallel to each other so that an electric field is passed therethrough, wherein liquid crystal molecules are driven by applying voltage between the upper electrode layer and the lower electrode layer, wherein
  a minor axis of each of the openings has a width in a range in which a V-T curve, which represents a relationship between voltage and transmittance ratio, does not shift with variation in the width of the minor axis.

2. The liquid crystal display device according to claim 1, wherein each of the openings is a slit opening that opens with a closed shape.

3. The liquid crystal display device according to claim 1, wherein the plurality of openings form a comb-shaped opening such that one ends of the openings are connected to each other.

4. The liquid crystal display device according to claim 1, wherein the upper electrode layer is a common electrode layer.

5. The liquid crystal display device according to claim 1, wherein the upper electrode layer is a pixel electrode layer.

6. The liquid crystal display device according to claim 1, wherein the width of said minor axis is greater than 6 μm.

7. The liquid crystal display device according to claim 1, wherein the electrode width, which corresponds to a distance between adjacent openings, is greater than 5 μm.

8. The liquid crystal display device according to claim 1, wherein an electrode width, which corresponds to a distance between the adjacent openings, is L and the width of a minor axis of each of the openings is S, wherein the ratio of L/S is 2.5 μm/4 μm.

9. A liquid crystal display device, comprising:
  a substrate;
  an insulating layer;
  an upper electrode layer; and
  a lower electrode layer, wherein the upper electrode layer and the lower electrode layer are formed above a same major surface of the substrate with the insulating layer therebetween, wherein a plurality of openings are formed in the upper electrode layer and arranged parallel to each other so that an electric field is passed therethrough, wherein liquid crystal molecules are driven by applying voltage between the upper electrode layer and the lower electrode layer, wherein
  where an electrode width, which corresponds to a distance between the adjacent openings, is L and the width of a minor axis of each of the openings is S, and when the sum of L and S is equal to or below 10 μm, the electrode width L is equal to or above 2.5 μm and the width S of the minor axis of each of the openings is equal to or above 4.0 μm, such that a V-T curve, which represents a relationship between voltage and transmittance ratio, does not shift with variation in the width of the minor axis S.

10. The liquid crystal display device according to claim 9, wherein each of the openings is a slit opening that opens with a closed shape.

11. The liquid crystal display device according to claim 9, wherein the plurality of openings form a comb-shaped opening such that one ends of the openings are connected to each other.

12. The liquid crystal display device according to claim 9, wherein the upper electrode layer is a common electrode layer.

13. The liquid crystal display device according to claim 9, wherein the upper electrode layer is a pixel electrode layer.

14. The liquid crystal display device according to claim 9, wherein the ratio of L/S is 2.5 μm/4 μm.

15. A liquid crystal device, comprising:
  a substrate;
  an upper electrode layer formed on the substrate;
  an insulating layer formed between the upper electrode and the substrate; and
  a lower electrode layer formed between the insulating layer and the substrate, the upper electrode layer being formed with a plurality of openings arranged parallel to each other, the plurality of openings allowing passage of an electric field and applying a voltage between the upper electrode layer and the lower electrode layer, the voltage driving liquid crystal molecules,
  each of the openings having a minor axis with a width in a range in which a V-T curve, which represents a relationship between voltage and transmittance ratio, does not shift with variation in the width of the minor axis.

16. The liquid crystal display device according to claim 15, wherein the width of said minor axis is greater than 6 μm.

17. The liquid crystal display device according to claim 15, wherein the electrode width, which corresponds to a distance between adjacent openings, is greater than 5 μm.

18. The liquid crystal display device according to claim 15, wherein an electrode width, which corresponds to a distance between the adjacent openings, is L and the width of a minor axis of each of the openings is S, wherein the ratio of L/S is 2.5 μm/4 μm.

19. A liquid crystal device, comprising:
  a substrate;
  an upper electrode layer formed on the substrate;
  an insulating layer formed between the upper electrode and the substrate; and
  a lower electrode layer formed between the insulating layer and the substrate, the upper electrode layer being formed with a plurality of openings arranged parallel to each other, the plurality of openings allowing passage of an electric field and applying a voltage between the upper electrode layer and the lower electrode layer, the voltage driving liquid crystal molecules, the upper electrode layer having an electrode width that corresponds to a distance between adjacent openings, each of the openings having a minor axis with an axis width, and when a sum of the electrode width and the axis width is equal to or less than 10 the electrode width L being equal to or greater than 2.5 μm, and the axis width being equal to or greater than 4.0 μm, such that a V-T curve, which represents a relationship between voltage and transmittance ratio, does not shift with variation in the width of the minor axis S.

20. The liquid crystal display device according to claim 19, wherein the ratio of L/S is 2.5 μm/4 μm.

* * * * *